Feb. 20, 1923.

J. B. LORGE

GRAIN THRASHER

Filed July 9, 1920

Inventor
J. B. Lorge,
By
Attorney

Feb. 20, 1923.
J. B. LORGE
1,446,311
GRAIN THRASHER
Filed July 9, 1920
3 sheets-sheet 2
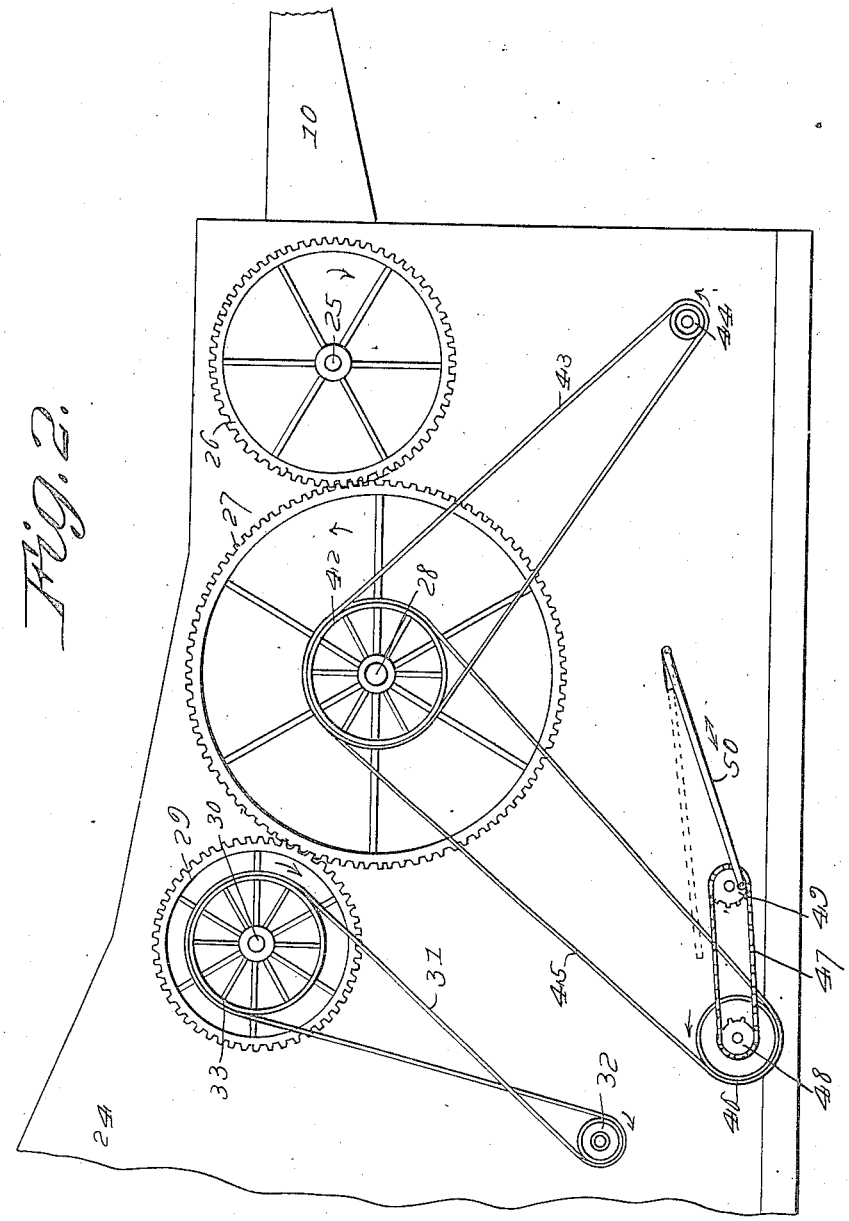
Inventor
J. B. Lorge,
By
Attorney Feb. 20, 1923.
J. B. LORGE
1,446,311
GRAIN THRASHER
Filed July 9, 1920
3 sheets-sheet 3
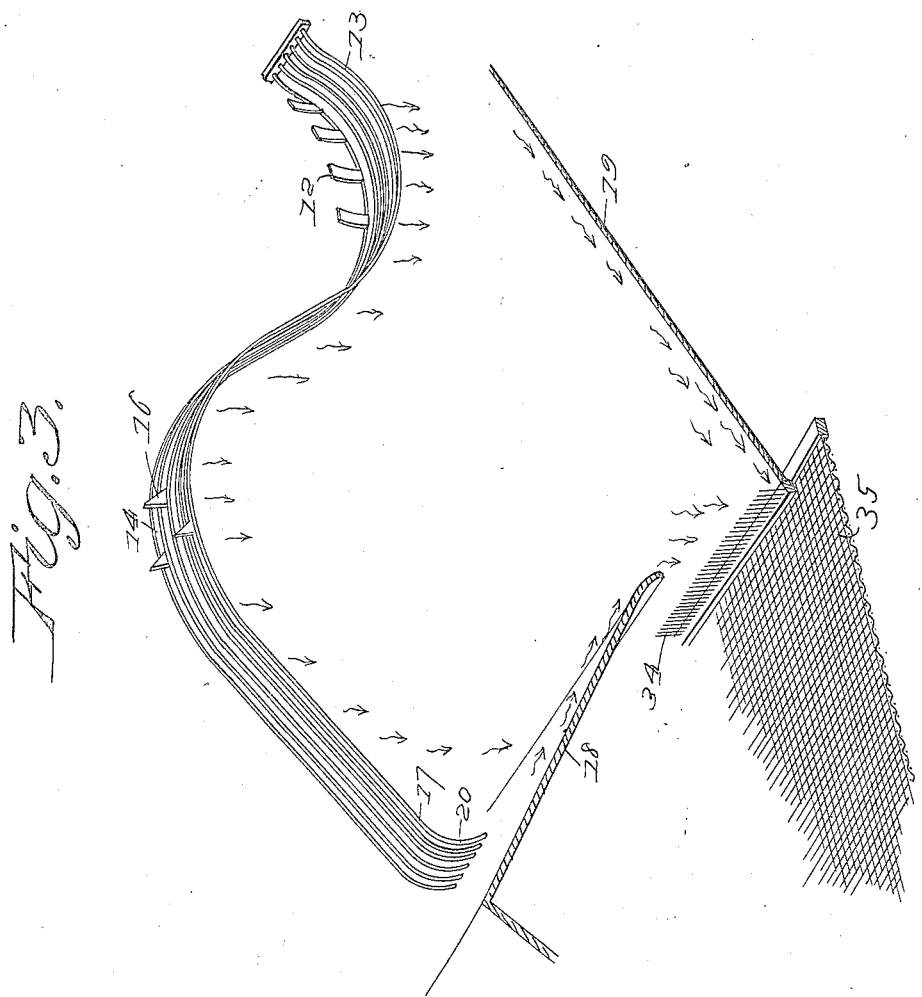

Patented Feb. 20, 1923.

1,446,311

UNITED STATES PATENT OFFICE.

JOHN B. LORGE, OF DETROIT, MICHIGAN.

GRAIN THRASHER.

Application filed July 9, 1920. Serial No. 395,015.

*To all whom it may concern:*

Be it known that I, JOHN B. LORGE, a subject of the King of Great Britain, residing at Detroit, in the county of Wayne and State of Michigan, have invented new and useful Improvements in Grain Thrashers, of which the following is a specification.

The object of the invention is to provide a grain thrasher mechanism wherein the use of shaking screens and feeders as a means of separating the grain from the straw may be dispensed with as a disadvantage owing to the tendency of the vibratory movement thereof to disarrange the other parts of the mechanism, together with the fact that these shaker elements in the use of threshing devices involve a considerable amount of trouble owing to the mounting thereof and the difficulty of keeping them in proper condition for performing their proper functions, and in this connection it is a further object to dispense with said vibratory features in a way that will not detract from the efficiency of the mechanism as a means of separating the grain but rather as a means of perfecting the result by avoiding the tendency of the shaker screens to become choked with the result of carrying a portion of the grain with the straw and thus of reducing the output of the mechanism; and with these objects in view, the invention consists in the construction and combination of parts, of which a preferred embodiment is shown in the accompanying drawings, wherein:—

Figure 2, is a side view of a portion of the same, showing the means for communicating motion to the several elements of the mechanism.

Figure 3, is a perspective view of the essential features of the separating means to show the course of the grain in its passage from the feed pipe to the outlet.

Figure 1:
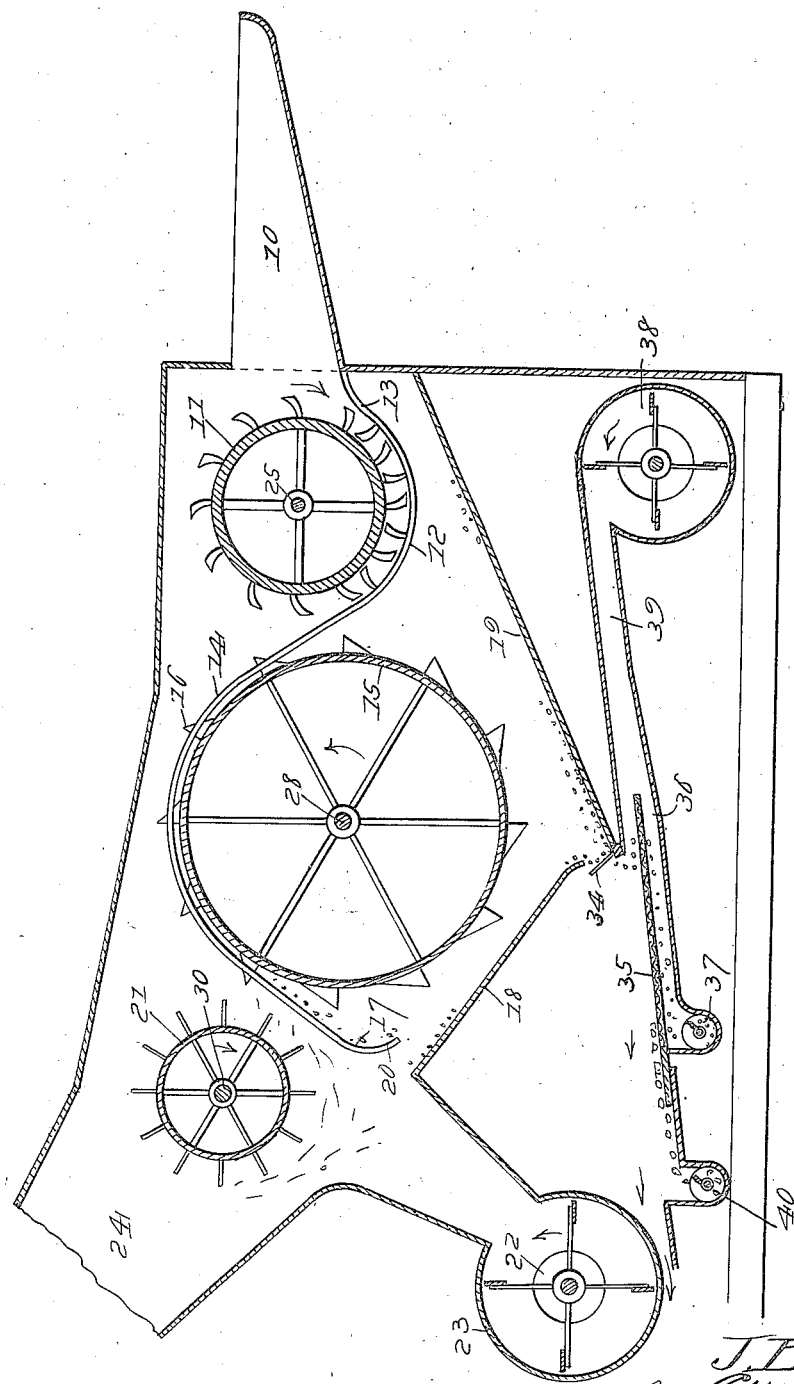
Figure 1, is a longitudinal sectional view of a thrasher mechanism embodying the invention.

Adjacent to the inlet or feed pipe 10 is located a cylinder 11 and concave 12 designed to perform the usual function in connection with means of this type and the grate bars 13 of the concave are preferably prolonged to extend to and form a rack 14 of upwardly convex form consisting of parallel rods or elements which are disposed concentric with the feed wheel or drum 15 having peripheral spurs 16 which project between the bars or rods of the rack and travel longitudinally thereof to carry the material as it leaves the cylinder and concave to a point of discharge indicated at 17 above a counter chute 18 which is inclined downwardly toward its rear end or in a reverse direction to the main grain chute 19 which extends along the cylinder and concave to the body portion of the rack 14 receiving the loosened grain which drops from the concave to the rack in the convex throw over of the straw.

The extremity of the rack at its discharge end is preferably reversely deflected or grooved as indicated at 20 so as to ensure the grain passing upon the counter chute 18 and particularly that grain which passes through the upwardly and forwardly inclined portion of the rack adjacent to a breaker drum 21 which rotates in the opposite direction to the carrier drum 15 at a relatively higher rate of speed and is designed as the straw is drawn into the zone of its operation, to shred out the straw at the front end of the advance column so as to loosen it and permit of the treatment of the grain which has been loosened by the previous treatment and expose this loose straw to the action of the discharge fan 22 operating in a suitable casing 23, the straw thus being discharged through the trunk 24.

As indicated in Figure 2, the shaft 25 of the cylinder may carry a gear 26 meshing with a gear 27 of the shaft 28 of the carrier drum said gear 27 in turn meshing with gear 29 reduced in diameter and carried by the shaft 30 of the breaker drum. The fan 22 may be driven by means of a cross belt 31 traversing pulleys 32 and 33 of which the latter is carried by the shaft of the breaker drum.

Located at the lower discharge end of the main grain chute 19 are the separating fingers 34 serving to permit the grain to pass therebetween while obstructing the passage of any light material such as broken straw and chaff, said fingers being extended upwardly and forwardly as indicated in Figures 1 and 3, the discharge edge of the counter chute 18 being disposed in rear thereof, and the discharge from the chute falling upon a vibratory separating screen 35 beneath which is arranged the drain pan 36 leading to a transverse conveyer 37. The screen permits the grain to drop through on to the pan for removal by the conveyor 37, while the blast fan 38 which directs a blast through the passage 39 to intercept the fall of the column of material upon the screen 35, separates the chaff and discharges it as indicated by the arrows in Figure 1, said heavier material passing to a discharge conveyor 40 which also extends transversely of the machine.

Thus the material after leaving the cylinder and concave is conveyed by the carrier drum for a considerable distance upwardly with the open work rack to provide an opportunity for the separation of the grain from the straw, the grain dropping directly through the carrier drum to the main chute 19 and the final separation of the remainder of the grain from the straw being effected by the action of the breaker drum which loosens and shreds the mass. The straw being lighter leaves the rack to permit the remainder of the grain to fall upon the counter chute 18 and thence be conveyed to the outlet or discharge end of the main chute. At this point, the separator fingers 34 while retaining the loose broken particles of the straw, permit the grain and chaff to drop into the path of the blast from the passage 39, while the grain finds its way to the thrasher screen and thence to the grain pan, while the chaff and light material is blown across the screen as heretofore indicated. The agitation of the air in the chamber into which the blast of air from the fan 38 is projected, serves to prevent obstruction by accumulations of light material in contact with the fingers 34, the tendency being to discharge such material in a reverse direction so as ultimately to be cut by the current of air introduced by the fan 22 and thus carried out with the straw.

By this arrangement it is possible to not only effect an effective separation of the grain from the straw, chaff and other waste materials, but to conserve the grain by guarding against the carrying of any considerable percentage of the same with the straw in the discharge of the latter through the trunk 24 and likewise the dropping of the latter into the fan casing 23 where it would serve to obstruct the operation of the mechanism.

In the construction illustrated, the blast fan is driven from a pulley 42 on the carrier drum shaft 28 through a belt 43 to a pulley 44 and likewise the conveyor 40 is operated from the carrier drum shaft by means of a belt 45 traversing the pulley 42 on said carrier drum shaft and pulley 46 of the conveyor 40. The grain conveyor 37 may likewise be actuated from the waste conveyor 40 by means of a chain 47 traversing the sprocket wheels 48 and 49 secured to said conveyors 40 and 37 and the shaker screen 35 may be actuated by means of a pitman 50 connected with the sprocket wheel 49.

As the screen or sieve 35 is of comparatively simple construction and small area and therefore light in weight, the vibration thereof, even though a reasonably rapid rate of drumming may be effected within the chamber, does not cause vibration of the machine frame, as is the case in ordinary shaker screens now in common use. Moreover the screen 35 may be mounted upon fixed bearings instead of being supported by cylinders, as is at present the ordinary practice. The means shown for conveying the straw during the separating of the grain therefrom and for shredding the straw as it reaches the discharge end of the rack section all guard against choking or backing of the straw and hence the impounding of the grain or the carrying of a certain proportion or percentage of the same to the waste outlet or discharge without affording a proper opportunity for separation.

The invention having been described, what is claimed as new and useful is:—

A grain separating mechanism having a carrier drum and an associated rack spanning the upper lay of the drum, a main chute disposed beneath the drum, an oppositely disposed counterchute disposed beneath the drum and overlapping the main chute at the lower edge thereof to provide a common outlet for both chutes, a breaker drum disposed in operative relation with the rack adjacent its discharge end and revoluble at a higher rate of speed than the carrier drum, a straw removing fan for supplying a blast of air to the straw adjacent to said breaker drum, and a chaff removing blast fan for producing a column of air intersecting the path of the grain discharged from said chutes.

In testimony whereof he affixes his signature.

JOHN B. LORGE.